(12) United States Patent
Chen et al.

(10) Patent No.: US 12,051,941 B2
(45) Date of Patent: Jul. 30, 2024

(54) SYNCHRONOUS RELUCTANCE MOTOR

(71) Applicant: GREE ELECTRIC APPLIANCES, INC. OF ZHUHAI, Zhuhai (CN)

(72) Inventors: Bin Chen, Zhuhai (CN); Yusheng Hu, Zhuhai (CN); Tong Tong, Zhuhai (CN); Suhua Lu, Zhuhai (CN); Keliang Liao, Zhuhai (CN); Yang Li, Zhuhai (CN); Yong Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 310 days.

(21) Appl. No.: 17/669,843

(22) Filed: Feb. 11, 2022

(65) Prior Publication Data
US 2022/0166269 A1 May 26, 2022

Related U.S. Application Data

(63) Continuation of application No. PCT/CN2020/098636, filed on Jun. 28, 2020.

(30) Foreign Application Priority Data

Sep. 27, 2019 (CN) .......................... 201910923586.1

(51) Int. Cl.
*H02K 1/24* (2006.01)
*H02K 1/276* (2022.01)
*H02K 19/10* (2006.01)

(52) U.S. Cl.
CPC ........... *H02K 1/246* (2013.01); *H02K 1/2766* (2013.01); *H02K 19/103* (2013.01); *H02K 2213/03* (2013.01)

(58) Field of Classification Search
None
See application file for complete search history.

(56) References Cited

U.S. PATENT DOCUMENTS 5,903,080 A 5/1999 Nashiki et al.
10,491,061 B2 * 11/2019 Jassal ....................... H02K 5/00
(Continued)

FOREIGN PATENT DOCUMENTS

| CN | 104901452 A | 9/2015 |
|---|---|---|
| CN | 105490495 A | 4/2016 |
| CN | 110635591 A | 12/2019 |

OTHER PUBLICATIONS

Dong et al., Rotor Optimal Design of the Gradient Flux-Barrier for Torque Ripple Reduction in Synchronous Reluctance Motor, Transactions of China Electrotechnical Society, pp. 21-31, vol. 32, No. 19, China, dated Oct. 31, 2017.
(Continued)

*Primary Examiner* — Bernard Rojas
(74) *Attorney, Agent, or Firm* — Westbridge IP LLC

(57) ABSTRACT

Disclosed is a synchronous reluctance motor. The synchronous reluctance motor includes: a stator core and a rotor core, where the stator core includes stator teeth, the rotor core includes a plurality of magnetic barrier groups arranged in a circumferential direction, each of the magnetic barrier groups includes a plurality of magnetic flux barriers arranged at intervals in a radial direction, a magnetic conduction channel is defined by every two adjacent magnetic flux barriers on a same pole, and a relationship between a quantity of the stator teeth $N_s$, a quantity of layers $B_s$ of the magnetic flux barriers on each pole, and a quantity of rotor poles 2p is as follows: $N_s/2p = B_s + 1$.

15 Claims, 6 Drawing Sheets

(56) References Cited

U.S. PATENT DOCUMENTS 11,088,603 B2 *  8/2021  Lee .................. H02K 19/14
11,777,346 B2 * 10/2023  Hu .................. H02K 1/246
                                          310/261.1

OTHER PUBLICATIONS

International Search Report issued in corresponding PCT Application No. PCT/CN2020/098636, dated Sep. 8, 2020.
Wirtten Opinion issued in corresponding PCT Application No. PCT/CN2020/098636, dated Sep. 8, 2020.

* cited by examiner

SYNCHRONOUS RELUCTANCE MOTOR

CROSS-REFERENCE TO RELATED APPLICATIONS

The present application is a continuation application of International Application No. PCT/CN2020/098636 filed on Jun. 28, 2020, which claims priority to Chinese Patent Application No. 201910923586.1 filed on Sep. 27, 2019. Both applications are incorporated herein by reference in their entireties

TECHNICAL FIELD

The present disclosure relates to the field of motor technologies, and in particular, to a synchronous reluctance motor.

BACKGROUND

Industrial motors are widely used in fields such as fans, water pumps, and general machinery, and consume more than 800 billion kilowatt-hours of electricity in the industry, so that there is a huge potential for energy saving. Currently, major motors are IE2 series asynchronous motors, which have low efficiency, large sizes, and complex process. In some high-energy efficiency scenarios, permanent magnet synchronous motors (IPM) are used, and can reach an energy efficiency class of IE4 or above. However, high-performance permanent magnets generally contain rare earth components, which makes it difficult to save energy and reduce costs.

With continuous improvement of electromagnetic and control technologies, synchronous reluctance motors with no permanent magnets and simple process have become a new research hotspot for de-permanent magnetization of synchronous motors. However, because the synchronous reluctance motor does not have any permanent magnets and a rotor structure has a multilayer magnetic flux barrier structure, it is difficult to suppress torque ripple and to design.

SUMMARY

The present disclosure provides a synchronous reluctance motor, including: a stator core and a rotor core. The stator core includes stator teeth, the rotor core includes a plurality of magnetic barrier groups arranged in a circumferential direction, each of the magnetic barrier groups includes a plurality of magnetic flux barriers arranged at intervals in a radial direction, a magnetic conduction channel is defined by every two adjacent magnetic flux barriers on a same pole, and a relationship between a quantity of the stator teeth $N_s$, a quantity of layers $B_s$ of the magnetic flux barriers on each pole, and a quantity of rotor poles 2p is as follows: $N_s/2p = B_s + 1$.

In some embodiments, a magnetic flux barrier on a same pole includes a first part extending in a tangential direction of the rotor core and a second part located at each of two ends of the first part, and the second part is bent outwards in the radial direction with respect to the first part.

In some embodiments, in a section perpendicular to a central axis of the rotor core, extension lines of two side walls of the second part of each magnetic flux barrier intersect an outer circumference of the rotor core, to form a class-A point close to a Q axis and a class-B point away from the Q axis.

In some embodiments, an included angle formed by connection lines between the central axis of the rotor core and two class-A points of a magnetic flux barrier on a same pole and on an outermost side of the rotor core in the radial direction is $A_0$, where $0.27 < A_0/(\pi/p) < 0.3$.

In some embodiments, on a same pole, on a same side of the Q axis, and in a direction away from the Q axis, included angles formed by connection lines between the central axis of the rotor core and every two adjacent class-A points are sequentially $A_{1-2}, A_{2-3}, \ldots$, and $A_{(N-1)-N}$, and included angles formed by connection lines between the central axis of the rotor core and every two adjacent class-B points are sequentially $B_{1-2}, B_{2-3}, \ldots$, and $B_{(N-1)-N}$, where $|A_{(i-1)-i}/B_{(i-1)-1} - 1| < 0.03$, and $i = 2, 3, \ldots, N$.

In some embodiments, on a same pole, on a same side of the Q axis, and in a direction away from the Q axis, included angles formed by connection lines between the central axis of the rotor core and every two adjacent class-A points are sequentially $A_{1-2}, A_{2-3}, \ldots$, and $A_{(N-1)-N}$, where $|A_{(i-2)-(i-1)}/A_{(i-1)-i} - 1| < 0.18$, and $i = 3, 4, \ldots,$ or N.

In some embodiments, a location of a maximum value of a salient pole difference of the rotor core on a same pole is located on a bisector of an angle between a Q axis and a D axis on the pole, where the salient pole difference is denoted by $L_d - L_q$, $L_d$ denotes a D axis inductance, and $L_q$ denotes a Q axis inductance.

In some embodiments, in a radial inward direction, radial thicknesses of first parts of the magnetic flux barriers are sinusoidally distributed.

In some embodiments, for a magnetic conduction channel on a same pole, there is a class-C point between a class-A point and a class-B point that are on a same side of the Q axis, the class-C point is located at a midpoint of a circumferential segment between the class-A point and the class-B point at an end part of each magnetic conduction channel, included angles formed, in a direction away from the Q axis, by a bisector of an angle between the Q axis and a D axis and connection lines between the central axis of the rotor core and class-C points are sequentially $\alpha_1, \alpha_1, \ldots$, and $\alpha_N$, and in a radial inward direction, radial thicknesses of the first parts of the magnetic flux barriers are sequentially $W_1, W_2, \ldots$, and $W_N$, where $$\frac{W_{i-1}}{W_i} = \frac{\sin\left(\frac{\pi}{2} - \alpha_{i1}\right)}{\sin\left(\frac{\pi}{2} - \alpha_i\right)} \pm a\,\%,$$

$i = 2, 3, \ldots,$ or N, and a denotes an adjustment margin.

In some embodiments, the second part includes a first bent segment communicated to the first part and a second bent segment located at one end, away from the first part, of the second part, in a section perpendicular to a central axis of the rotor core, straight lines radially extending from two endpoints at a tail end of the second bent segment of each magnetic flux barrier intersect an outer circumference of the rotor core, to form a class-A point close to a Q axis and a class-B point away from the Q axis, and a distance between each endpoint at the tail end of the second bent segment and a point at which a straight line radially extending from the endpoint intersects the outer circumference of the rotor core is a minimum distance between the endpoint and the outer circumference of the rotor core.

The synchronous reluctance motor provided in the present disclosure includes a stator core and a rotor core, where the stator core includes stator teeth, the rotor core includes a plurality of magnetic barrier groups arranged in a circumferential direction, each of the magnetic barrier groups includes a plurality of magnetic flux barriers arranged at intervals in a radial direction, a magnetic conduction channel is defined by every two adjacent magnetic flux barriers on a same pole, and a relationship between a quantity of the stator teeth $N_s$, a quantity of layers $B_s$ of the magnetic flux barriers on each pole, and a quantity of rotor poles 2p is as follows: $N_s/2p=B_s+1$. There is a correlation between the quantity of the stator teeth, the quantity of layers of the magnetic flux barriers, and the quantity of rotor poles, which affects working performance of the motor. Through topological researches on an optimal quantity of the stator teeth and an optimal quantity of layers of the magnetic conduction channel of the rotor, the relationship between the three parameters is limited in the above formulae, so that the quantity of the stator teeth, the quantity of layers of the magnetic flux barriers, and the quantity of rotor poles may be set reasonably, thereby reducing torque ripple of the motor. In addition, the torque ripple of the synchronous reluctance motor is suppressed at a relatively low level, thereby reducing rotational noise of the motor, and improving performance of the motor.

DETAILED DESCRIPTION

Figure 1:
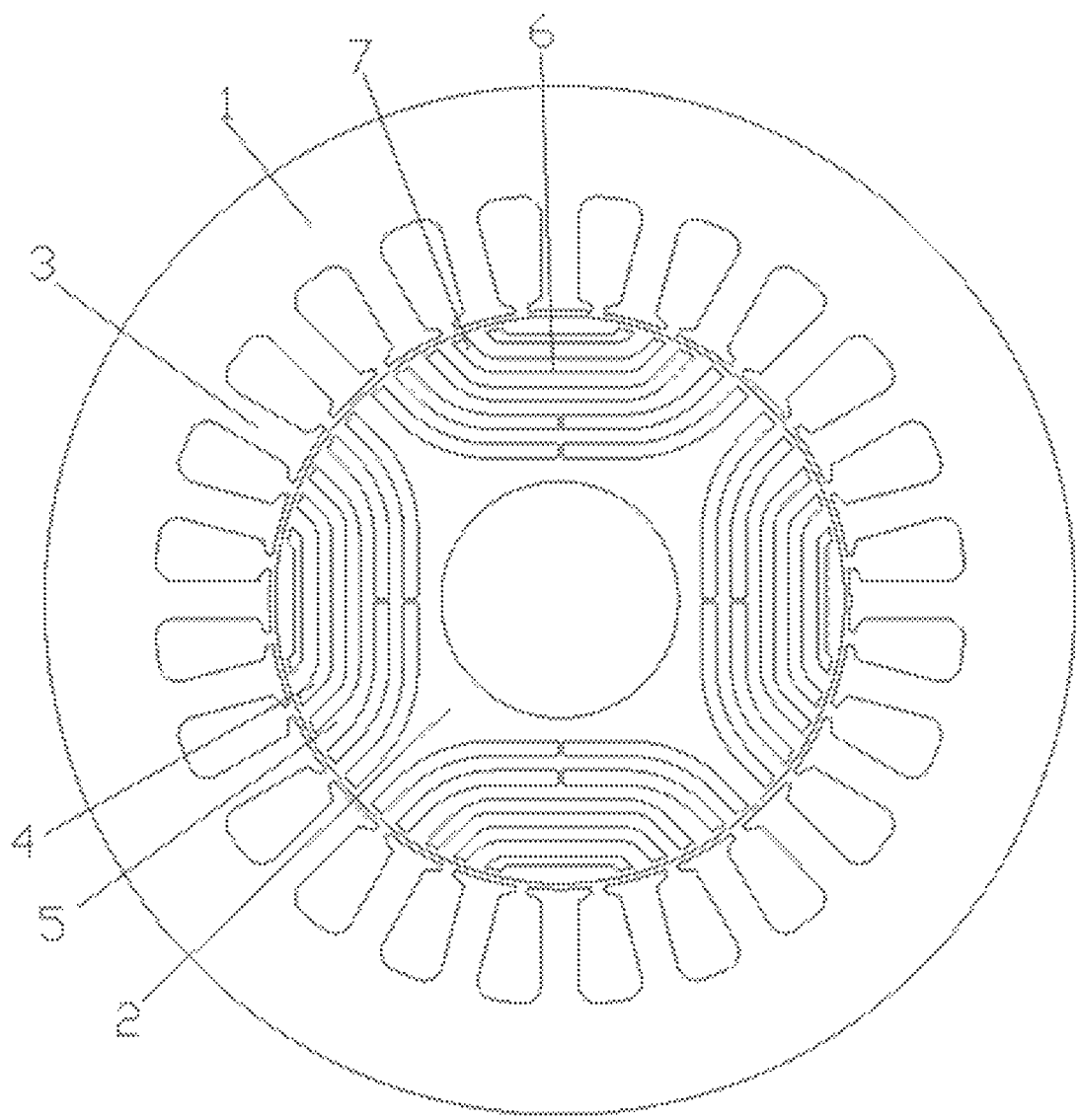
FIG. 1 is a schematic structural diagram of a synchronous reluctance motor according to an embodiment of the present disclosure.
Figure 2:
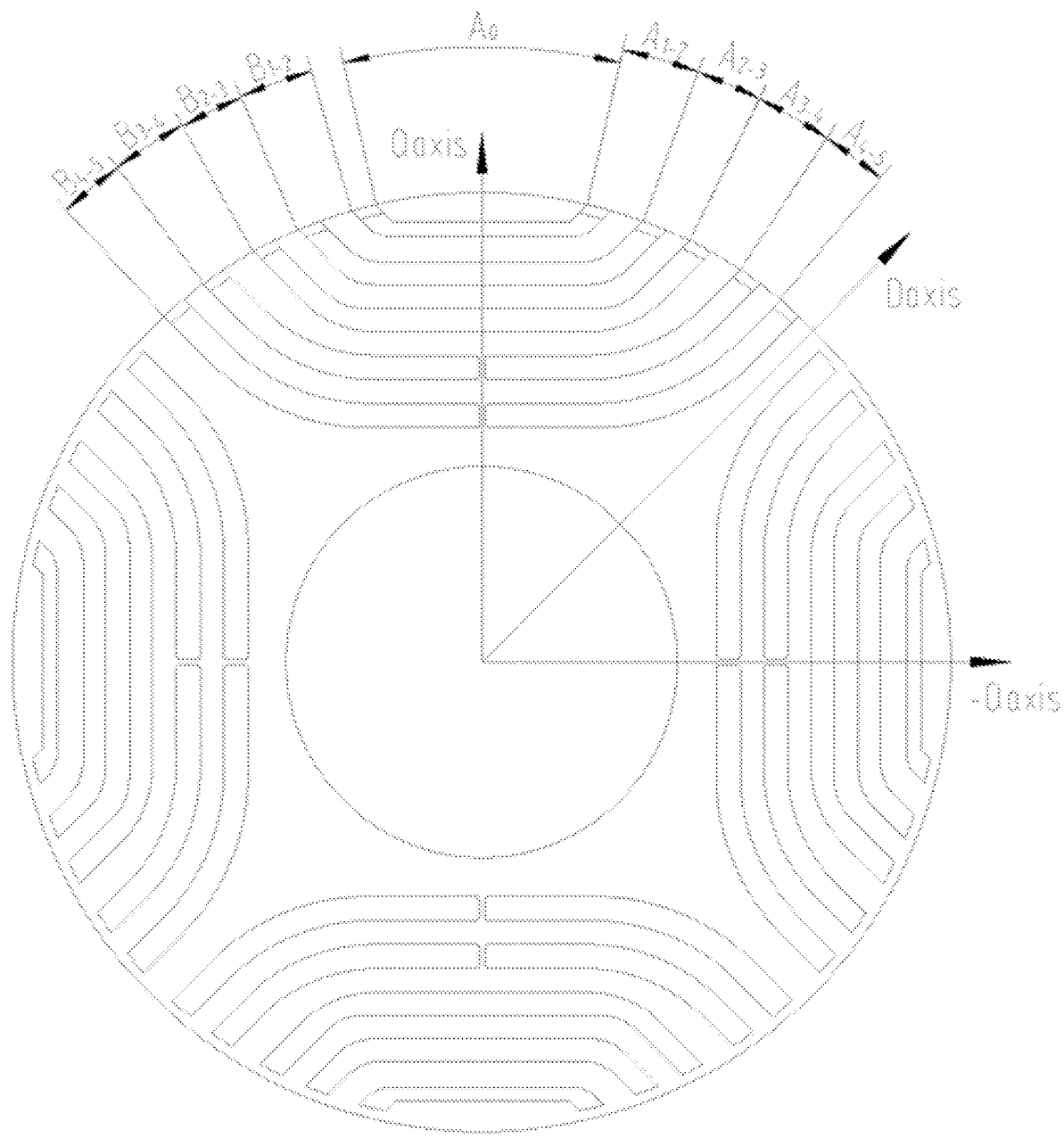
FIG. 2 is a schematic structural diagram of a synchronous reluctance motor in a first size according to an embodiment of the present disclosure.
Figure 3:
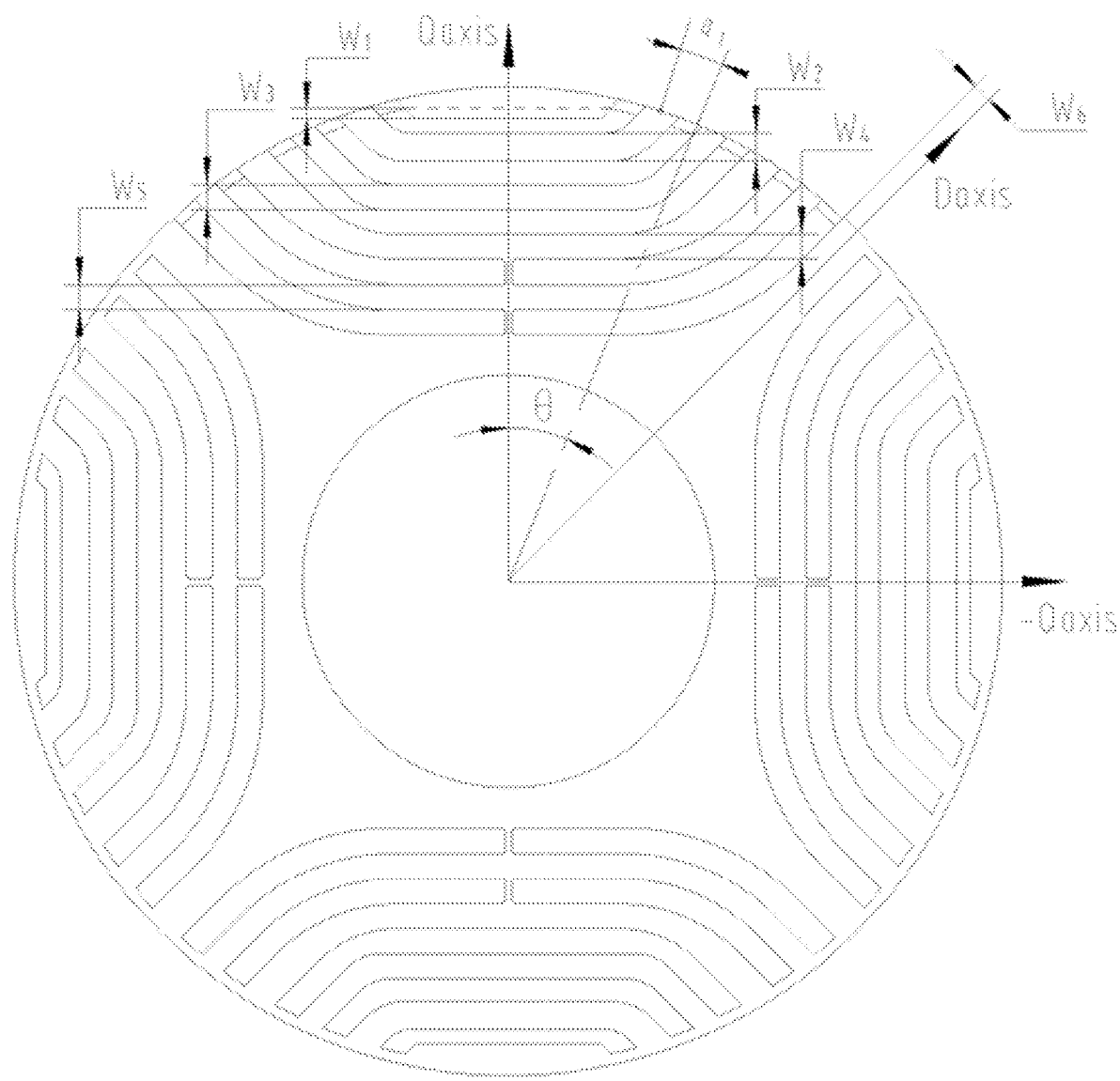
FIG. 3 is a schematic structural diagram of a synchronous reluctance motor in a second size according to an embodiment of the present disclosure.
Figure 4:
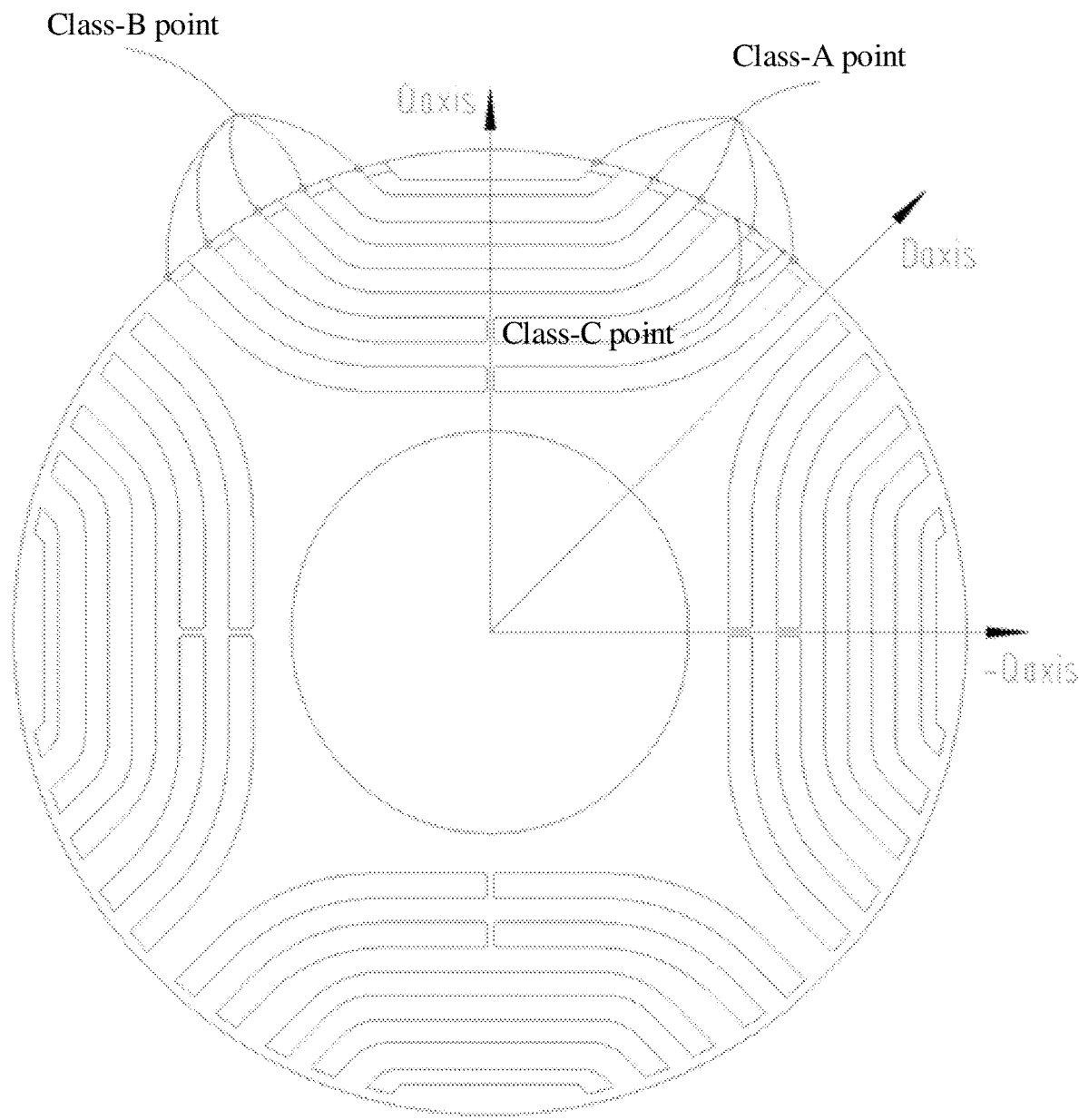
FIG. 4 is a structural diagram of distribution of class-A points and class-B points of a synchronous reluctance motor according to some embodiments of the present disclosure.
Figure 5:
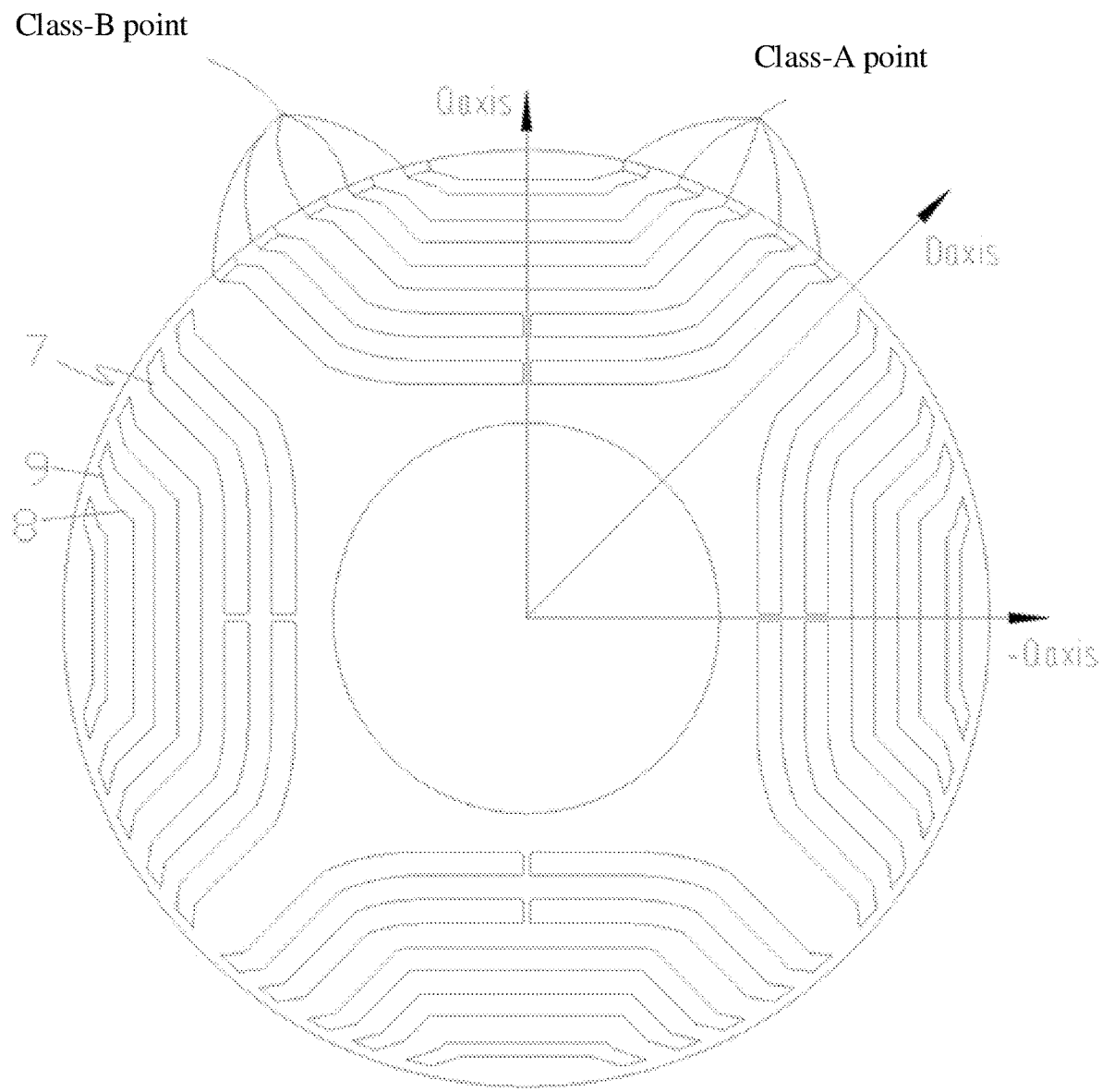
FIG. 5 is a structural diagram of distribution of class-A points and class-B points of a synchronous reluctance motor according to some other embodiments of the present disclosure.

In combination with FIG. 1 to FIG. 6, a synchronous reluctance motor according to an embodiment of the present disclosure includes a stator core 1 and a rotor core 2. The stator core 1 includes stator teeth 3, the rotor core 2 includes a plurality of magnetic barrier groups arranged in a circumferential direction, and each of the magnetic barrier groups includes a plurality of magnetic flux barriers 4 arranged at intervals in a radial direction. A magnetic conduction channel 5 is defined by every two adjacent magnetic flux barriers 4 on a same pole, and a relationship between a quantity of the stator teeth $N_s$, a quantity of layers $B_s$ of the magnetic flux barriers on each pole, and a quantity of rotor poles 2p is as follows: $N_s/2p=B_s+1$.

There is a correlation between the quantity of the stator teeth, the quantity of layers of the magnetic flux barriers, and the quantity of rotor poles, which affects working performance of the motor. Through topological researches on an optimal quantity of the stator teeth and an optimal quantity of layers of the magnetic conduction channel of the rotor, the relationship between the three parameters is limited in the above formula, so that the quantity of the stator teeth, the quantity of layers of the magnetic flux barriers, and the quantity of rotor poles may be set reasonably, and may reasonably match each other, thereby reducing torque ripple of the motor. In addition, the torque ripple of the synchronous reluctance motor is suppressed at a relatively low level, thereby reducing rotational noise of the motor, and improving performance of the motor. According to the foregoing solution, an overall torque ripple of the synchronous reluctance motor may be maintained below 10%.

Through researches on a rotor topological structure, it is found that, compared with a torque ripple of a motor based on other structure matching, a torque ripple based on matching between the quantity of the stator teeth, the quantity of rotor poles, and the quantity of layers of the magnetic flux barriers can reach a relatively low torque ripple level, for example, 24 slots-4 poles-5 layers of magnetic flux barriers, 36 slots-6 poles-5 layers of magnetic flux barriers, or 48 slots-6 poles-7 layers of magnetic flux barriers.

In this embodiment, the stator core 1 includes a rotor accommodation cavity, the rotor core 2 is disposed in the rotor accommodation cavity and can rotate around a central axis of the stator core 1, and there is an air gap between an inner circumference of the stator core 1 and an outer circumference of the rotor core 2. An inner circumferential side of the stator core 1 is provided with stator teeth 3 and a plurality of stator slots that are both uniformly arranged along a circumferential direction.

The rotor core 2 is not provided with any permanent magnet. The magnetic flux barriers 4 are formed by hollowing out a plurality of air slots on a circular disc made of a magnetic conduction material. A magnetic conduction channel 5 is defined by every two adjacent magnetic flux barriers. A plurality of magnetic flux barriers 4 and a plurality of magnetic conduction channels 5 are arranged alternately in the radial direction, to form a pole. An even number of poles are uniformly distributed along a circumference.

Each of the magnetic flux barriers 4 on a same pole includes a first part 6 extending in a tangential direction of the rotor core 2 and a second part 7 located at each of two ends of the first part 6, and the second part 7 is bent outwards in the radial direction with respect to the first part 6. By disposing a bent part, a difference between a direct-axis inductance and a quadrature-axis inductance may be increased, thereby increasing a salient pole ratio, and improving working performance of the synchronous reluctance motor.

In some embodiments, in a section perpendicular to the central axis of the rotor core 2, extension lines of two side walls of the second part 7 of each magnetic flux barrier 4 intersect an outer circumference of the rotor core 2, to form a class-A point close to a Q axis and a class-B point away from the Q axis.

The magnetic flux barriers 4 on the rotor core 2 are sequentially defined as $a_1, a_2, \ldots,$ and $a_N$ from outside to inside in the radial direction. Each magnetic flux barrier 4 includes a first part 6 that is horizontal in the tangential direction and a second part 7 bent in the radial direction. A part, close to the circumferential side of the rotor, of the second part 7 that is bent in the radial direction is a tail end of the magnetic flux barrier. The tail end is not communicated to the air gap and is provided with a thin-walled structure distributed along the tangential direction, forming a tangential rib. The tangential rib is formed by intersection of the outer circumference of the rotor core 2 and extension lines of two side walls of the second part 7, and a thickness of the rib usually ranges from 0.3 mm to 1.0 mm. Two ends of each rib form two marking points on the outer circumference of the rotor core 2. On each pole, marking points close to a Q axis on the pole are collectively referred to as class-A points, and those away from the Q axis are collectively referred to as class-B points.

In some embodiments, each tangential rib is provided with one class-A point and one class-B point. On a same pole and on a same side of the Q axis, an angle formed between class-A points of a magnetic flux barrier $a_1$ and a magnetic flux barrier $a_2$ by taking a center of the rotor core 2 as an origin is denoted by $A_{1-2}$, an angle formed between class-A points of the magnetic flux barrier $a_2$ and a magnetic flux barrier $a_3$ by taking the center of the rotor core 2 as the origin is denoted by $A_{2-3}$, an angle formed between class-B points of the magnetic flux barrier $a_1$ and the magnetic flux barrier $a_2$ by taking the center of the rotor core 2 as the origin is denoted by $B_{1-2}$, an angle formed between class-B points of the magnetic flux barrier $a_2$ and the magnetic flux barrier $a_3$ by taking the center of the rotor core 2 as the origin is denoted by $B_{2-3}$ . . . .

In some embodiments, an included angle formed by connection lines between the central axis of the rotor core 2 and two class-A points, on two sides of the Q axis, of the magnetic flux barrier 4 on a same pole and on an outermost side of the rotor core 2 in the radial direction is $A_0$, where $0.27 < A_0/(\pi/p) < 0.3$. In this case, torque output of the motor may be maintained at a relatively high level.

When $A_0/(\pi/P)$ is less than 0.27, a span of the outermost layer of magnetic conduction channel 5 is too small. As a result, a reluctance torque cannot be produced by effectively utilizing a magnetic tensile force. When $A_0/(\pi/p)$ is greater than 0.3, a span of the outermost layer of magnetic conduction channel 5 is too large. As a result, structural space of remaining magnetic conduction channels 5 is squeezed, and a part of increased span, of the magnetic conduction channel 5 does not produce an effective reluctance torque.

On a same pole, on a same side of the Q axis, and in a direction away from the Q axis, included angles formed by connection lines between the central axis of the rotor core 2 and every two adjacent class-A points are sequentially $A_{1-2}$, $A_{2-3}$, . . . , and $A_{(N-1)-N}$, and included angles formed by connection lines between the central axis of the rotor core 2 and every two adjacent class-B points are sequentially $B_{1-2}$, $B_{2-3}$, . . . , and $B_{(N-1)-N}$, where $|A_{(i-1)-i}/B_{(i-1)-1}-1|<0.03$, and i=2, 3, . . . , or N.

Angles respectively formed by class-A points and class-B points of ribs at tail ends of any two adjacent magnetic flux barriers 4 are similar, and a difference therebetween is within a range of 3%. Specific descriptions are as follows:

$$|A_{1-2}/B_{1-2}-1|<0.03$$

$$|A_{2-3}/B_{2-3}-1|<0.03$$

...

$$|A_{(N-1)-N}/B_{(N-1)N}-1|<0.03$$

It may be found in combination with a structure of the rotor that, angles at the tail ends of every two adjacent magnetic conduction channels 5 are basically equivalent because of limitations of the above formulae, and an angle fluctuation is maintained within a relatively small range. Slots of the stator are uniformly distributed, and a width of a slot opening is fixed. Therefore, when the same design principle as the slot opening of the stator is adopted for the rotor, it is conducive to preventing torque ripple harmonic from being generated due to an inconsistent slot structure of the rotor.

On a same pole, on a same side of the Q axis, and in a direction away from the Q axis, included angles formed by connection lines between the central axis of the rotor core 2 and every two adjacent class-A points are sequentially $A_{1-2}$, $A_{2-3}$, . . . , and $A_{(N-1)-N}$, where $|A_{(i-2)-(i-1)}/A_{(i-1)-i}-1|0.18$, and i=3, 4, . . . , or N.

When the rotor rotates anticlockwise, there is a difference between angles formed by class-A points of ribs at the tail ends of successively adjacent magnetic flux barriers, and when a ratio difference between the angles is within a range of 0.1 to 0.18, a minimum value of a torque ripple is obtained.

$$0.1 < |A_{1-2}/A_{2-3}-1| < 0.18$$

$$0.1 < |A_{2-3}/A_{3-4}-1| < 0.18$$

...

$$0.1 < |A_{(N-2)-(N-1)}/A_{(N-1)-N}-1| < 0.18$$

Based on a design that opening angles of the tail ends of the magnetic flux barriers of the rotor are basically equivalent, a width of the tail end of each magnetic conduction channel 5 is equivalently adjusted by using limitations of the above formulae, so that each magnetic conduction channel 5 is adjusted to have a phase difference when a reluctance torque is produced, and each magnetic conduction channel of the rotor outputs power alternately, thereby suppressing torque ripple.

Based on the foregoing design, angles of the tail ends of adjacent layers of magnetic conduction channels 5 are basically equivalent, and an angle fluctuation is maintained within a relatively small range. Slots of the stator are uniformly distributed, and a width of a slot opening is fixed. Therefore, when the same design principle as the slot opening of the stator is adopted for a slot opening of the rotor, it is conducive to preventing torque ripple harmonic from being generated due to an inconsistent slot structure of the rotor.

Due to the existence of the slot opening of the rotor, the continuous outer circumference becomes notched. A gear is used as an example, for example, a slot opening of the stator forms a gear, and in this case, a slot opening of the rotor matches a structure formed by the slot opening of the stator, thereby facilitating meshing. Therefore, an output torque is more stable.

The angle of the tail end of each magnetic conduction channel 5 is defined by the foregoing three formulae, so that a torque ripple may be suppressed at a level of 4% to 5% while guaranteeing torque output.

A location of a maximum value of a salient pole difference of the rotor core 2 on a same pole is located on a bisector of an angle between a Q axis and a D axis on the pole, where the salient pole difference is denoted by $L_d-L_q$, $L_d$ denotes a D axis inductance, and $L_q$ denotes a Q axis inductance.

A formula of torque output of the motor is as follows:

$$T_e = \tfrac{1}{2} p (L_d-L_q) i_s^2 \sin 2\theta,$$

where $T_e$ denotes an electromagnetic torque, p denotes a quantity of pole pairs of the motor, $L_d$ denotes a D axis inductance, $L_q$ denotes a Q axis inductance, θ denotes a torque control angle, and $i_s$ denotes a value of resultant current of three-phase winding.

When a value of θ is 45 degrees (electrical degrees), a variable sin(2θ) can have a maximum value. Therefore, in a structural design, a torque can be maximized when a location of the salient pole difference $L_d$–$L_q$ is designed on the bisector of the angle between the Q axis and the D axis. The magnetic conduction channels are designed to a structure with a roughly sinusoidal distribution, which matches magnetic field distribution, thereby helping alleviate magnetic saturation and increase an output torque. Therefore, in the radial inward direction, radial thicknesses of the first parts 6 that are horizontal in the tangential direction, of the magnetic conduction channels 5 of the rotor has a characteristic of sinusoidal distribution. Based on such a design, an optimal torque control angle of the rotor structure may be controlled at 45 degrees (electrical degrees).

Based on the foregoing design, magnetic saturation may be alleviated, which is equivalent to increasing a value of the inductance $L_d$. In this way, a salient pole difference is increased, thereby further improving performance of the motor.

For a magnetic conduction channel 5 on a same pole, there is a class-C point between a class-A point and a class-B point that are on a same side of the Q axis, the class-C point is located at a midpoint of a circumferential segment between the class-A point and the class-B point at an end part of each magnetic conduction channel 5, included angles formed, in a direction away from the Q axis, by a bisector of the angle between the Q axis and a D axis and connection lines between the central axis of the rotor core 2 and class-C points are sequentially $\alpha_1, \alpha_2, \ldots,$ and $\alpha_N$, and in a radial inward direction, thicknesses of the magnetic conduction channels 5 are sequentially $W_1, W_2, \ldots,$ and $W_N$. For example, $W_1$ denotes a thickness of the first layer of magnetic conduction channel, and $W_6$ denotes a thickness of the sixth layer of magnetic conduction channel.

where $$\frac{W_{i-1}}{W_i} = \frac{\sin(\frac{\pi}{2} - \alpha_{i-1})}{\sin(\frac{\pi}{2} - \alpha_i)} \pm a\%$$

i=2, 3, . . . , or N, and a denotes an adjustment margin.

For example, a may be 5, and a % is a margin that allows a thickness ratio of the magnetic conduction channels 5 to be properly adjusted based on problems such as spatial arrangement.

Based on a design that opening angles of the tail ends of the magnetic flux barriers of the rotor are basically equivalent, a width of the tail end of each magnetic conduction channel is equivalently optimized, so that each magnetic conduction channel 5 is adjusted to have a phase difference when a reluctance torque is produced, a torque may implement a peak-valley complementary effect, and the magnetic conduction channel 5 of the rotor outputs power alternately, thereby suppressing torque ripple effectively.

Figure 6:
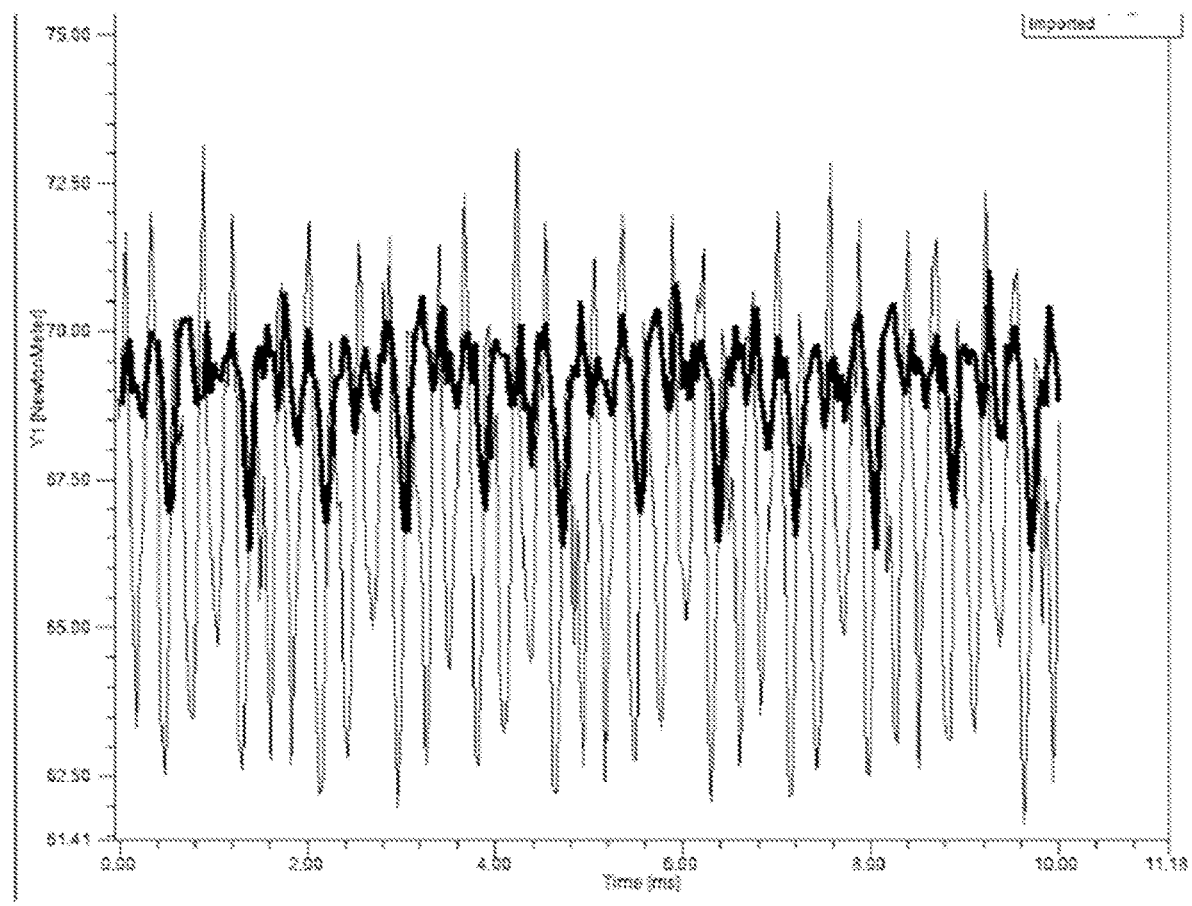
FIG. 6 is a comparison diagram of a torque curve of a synchronous reluctance motor according to an embodiment of the present disclosure and that of an existed synchronous reluctance motor.

A thick line shown in FIG. 6 represents a torque curve of a synchronous reluctance motor according to an embodiment of the present disclosure, and a thin line shown in FIG. 6 represents a torque curve of an existed synchronous reluctance motor. It can be seen from the figure that, a torque ripple of the synchronous reluctance motor in the present disclosure is greatly reduced compared with that in the prior art.

In some other embodiments of the present disclosure, the second part 7 includes a first bent segment 8 communicated to the first part 6 and a second bent segment 9 located at one end, away from the first part 6, of the second part 7. In a section perpendicular to a central axis of the rotor core 2, straight lines radially extending from two endpoints at a tail end of the second bent segment 9 of each magnetic flux barrier 4 intersect an outer circumference of the rotor core 2, to form a class-A point close to a Q axis and a class-B point away from the Q axis, and a distance between each endpoint at the tail end of the second bent segment 9 and a point at which a straight line radially extending from the endpoint intersects the outer circumference of the rotor core 2 is a minimum distance between the endpoint and the outer circumference of the rotor core 2.

In this embodiment, although a two-arm structure of the magnetic flux barrier 4 is bent at least twice, points on the structure that define each magnetic conduction channel are still points, at tail ends of the thin-walled structure, of an effective part of the rib of the magnetic flux barrier that is a part of an equal-thickness segment of the thin-walled structure, or points at a part beginning to become thick when expanding towards two ends from a thinnest part in the circumferential direction. Therefore, this is still applicable to the above classification of class-A points and class-B points, so that a design of the magnetic flux barrier 4 can meet the limitation of the above formulae and ensure that the opening angles of the tail end of the magnetic flux barrier of the rotor are basically equivalent.

It is easily understood by those skilled in the art that on the premise of no conflict, the foregoing advantageous methods can be freely combined and superposed.

The foregoing descriptions are merely preferred embodiments of the present disclosure, but are not intended to limit the present disclosure. Any modification, equivalent replacement, or improvement made without departing from the principle of the present disclosure shall fall within the protection scope of the present disclosure. The foregoing descriptions are merely the optional implementations of the present disclosure. It should be noted that those of ordinary skill in the art may further make several improvements and variations without departing from the technical principles described in the present disclosure, and these improvements and variations also fall within the protection scope of the present disclosure.

What is claimed is:

1. A synchronous reluctance motor, comprising: a stator core and a rotor core, wherein the stator core comprises stator teeth, the rotor core comprises a plurality of magnetic barrier groups arranged in a circumferential direction, each of the magnetic barrier groups comprises a plurality of magnetic flux barriers arranged at intervals in a radial direction, a magnetic conduction channel is defined by every two adjacent magnetic flux barriers on a same pole, and a relationship between a quantity of the stator teeth $N_s$, a quantity of layers $B_s$ of the magnetic flux barriers on each pole, and a quantity of rotor poles 2p is as follows: $N_s/2p=B_s+1$, wherein the rotor poles are uniformly distributed along a circumferential direction.

2. The synchronous reluctance motor according to claim 1, wherein a magnetic flux barrier on a same pole comprises a first part extending in a tangential direction of the rotor core and a second part located at each of two ends of the first part, and the second part is bent outwards in the radial direction with respect to the first part.

3. The synchronous reluctance motor according to claim 2, wherein in a section perpendicular to a central axis of the rotor core, extension lines of two side walls of the second part of each magnetic flux barrier intersect an outer circumference of the rotor core, to form a class-A point close to a Q axis and a class-B point away from the Q axis.

4. The synchronous reluctance motor according to claim 3, wherein an included angle formed by connection lines between the central axis of the rotor core and two class-A points of a magnetic flux barrier on a same pole and on an outermost side of the rotor core in the radial direction is $A_0$, wherein $0.27 < A_0/(\pi/p) < 0.3$.

5. The synchronous reluctance motor according to claim 3, wherein on a same pole, on a same side of the Q axis, and in a direction away from the Q axis, included angles formed by connection lines between the central axis of the rotor core and every two adjacent class-A points are sequentially $A_{1-2}$, $A_{2-3}$, ..., and $A_{(N-1)-N}$, and included angles formed by connection lines between the central axis of the rotor core and every two adjacent class-B points are sequentially $B_{1-2}$, $B_{2-3}$, ..., and $B_{(N-1)-N}$, wherein $|A_{(i-1)-i}/B_{(i-1)-i}-1|<0.03$, and $i=2, 3, \ldots,$ or N.

6. The synchronous reluctance motor according to claim 3, wherein on a same pole, on a same side of the Q axis, and in a direction away from the Q axis, included angles formed by connection lines between the central axis of the rotor core and every two adjacent class-A points are sequentially $A_{1-2}$, $A_{2-3}$, ..., and $A_{(N-1)-N}$, wherein $|A_{(i-2)-(i-1)}/A_{(i-1)-i}-1|<0.18$, and $i=3, 4, \ldots,$ or N.

7. The synchronous reluctance motor according to claim 1, wherein a location of a maximum value of a salient pole difference of the rotor core on a same pole is located on a bisector of an angle between a Q axis and a D axis on the pole, wherein the salient pole difference is denoted by $L_d - L_q$, $L_d$ denotes a D axis inductance, and $L_q$ denotes a Q axis inductance.

8. The synchronous reluctance motor according to claim 2, wherein in a radial inward direction, radial thicknesses of parts that are horizontal in the tangential direction of the rotor core, of magnetic conduction channels are sinusoidally distributed.

9. The synchronous reluctance motor according to claim 3, wherein for a magnetic conduction channel on a same pole, there is a class-C point between a class-A point and a class-B point that are on a same side of the Q axis, the class-C point is located at a midpoint of a circumferential segment between the class-A point and the class-B point at an end part of each magnetic conduction channel, included angles formed, in a direction away from the Q axis, by a bisector of an angle between the Q axis and a D axis and connection lines between the central axis of the rotor core and class-C points are sequentially $\alpha_1, \alpha_2, \ldots,$ and $\alpha_N$, and in a radial inward direction, radial thicknesses of parts that are horizontal in the tangential direction of the rotor core, of magnetic conduction channels are sequentially $W_1$, $W_2, \ldots,$ and $W_N$, wherein $$\frac{W_{i-1}}{W_i} = \frac{\sin\left(\frac{\pi}{2} - \alpha_{i-1}\right)}{\sin\left(\frac{\pi}{2} - \alpha_i\right)} \pm a\%,$$

$i=2, 3, \ldots,$ or N, and a denotes an adjustment margin.

10. The synchronous reluctance motor according to claim 2, wherein the second part comprises a first bent segment communicated to the first part and a second bent segment located at one end, away from the first part, of the second part, and in a section perpendicular to a central axis of the rotor core, straight lines radially extending from two endpoints at a tail end of the second bent segment of each magnetic flux barrier intersect an outer circumference of the rotor core, to form a class-A point close to a Q axis and a class-B point away from the Q axis.

11. The synchronous reluctance motor according to claim 10, wherein a distance between each endpoint at the tail end of the second bent segment and a point at which a straight line radially extending from the endpoint intersects the outer circumference of the rotor core is a minimum distance between the endpoint and the outer circumference of the rotor core.

12. The synchronous reluctance motor according to claim 10, wherein an included angle formed by connection lines between the central axis of the rotor core and two class-A points of a magnetic flux barrier on a same pole and on an outermost side of the rotor core in the radial direction is $A_0$, wherein $0.27<A_0/(\pi/p)<0.3$.

13. The synchronous reluctance motor according to claim 10, wherein on a same pole, on a same side of the Q axis, and in a direction away from the Q axis, included angles formed by connection lines between the central axis of the rotor core and every two adjacent class-A points are sequentially $A_{1-2}$, $A_{2-3}$, ..., and $A_{(N-1)-N}$, and included angles formed by connection lines between the central axis of the rotor core and every two adjacent class-B points are sequentially $B_{1-2}$, $B_{2-3}$, ..., and $B_{(N-1)-N}$, wherein $|A_{(i-1)-i}/B_{(i-1)-i}-1|<0.03$, and $i=2, 3, \ldots,$ or N.

14. The synchronous reluctance motor according to claim 10, wherein on a same pole, on a same side of the Q axis, and in a direction away from the Q axis, included angles formed by connection lines between the central axis of the rotor core and every two adjacent class-A points are sequentially $A_{1-2}$, $A_{2-3}$, ..., and $A_{(N-1)-N}$, wherein $|A_{(i-2)-(i-1)}/A_{(i-1)-i}-1|<0.18$, and $i=3, 4, \ldots,$ or N.

15. The synchronous reluctance motor according to claim 10, wherein for a magnetic conduction channel on a same pole, there is a class-C point between a class-A point and a class-B point that are on a same side of the Q axis, the class-C point is located at a midpoint of a circumferential segment between the class-A point and the class-B point at an end part of each magnetic conduction channel, included angles formed, in a direction away from the Q axis, by a bisector of an angle between the Q axis and a D axis and connection lines between the central axis of the rotor core and class-C points are sequentially $\alpha_1, \alpha_2, \ldots,$ and $\alpha_N$, and in a radial inward direction, radial thicknesses of parts that are horizontal in the tangential direction of the rotor core, of magnetic conduction channels are sequentially $W_1$, $W_2, \ldots,$ and $W_N$, wherein $$\frac{W_{i-1}}{W_i} = \frac{\sin\left(\frac{\pi}{2} - \alpha_{i-1}\right)}{\sin\left(\frac{\pi}{2} - \alpha_i\right)} \pm a\%,$$

$i=2, 3, \ldots,$ or N, and a denotes an adjustment margin.

* * * * *